US008814709B2

(12) United States Patent
Staniszewski et al.

(10) Patent No.: US 8,814,709 B2

(45) Date of Patent: Aug. 26, 2014

(54) INTERMODULATION-RESISTANT FLEXIBLE SHAFT HAVING ELECTRICALLY INSULATING COATED WIRES

(75) Inventors: Walter Staniszewski, Aschau (DE); Stefan Berger, Thansau-Rohrdorf (DE); Ralf Häntsch, Raubling (DE); Hubert Polster, Kirchheim (DE)

(73) Assignee: Kathrein-Werke KG, Rosenheim (DE)

( * ) Notice: Subject to any disclaimer, the term of this patent is extended or adjusted under 35 U.S.C. 154(b) by 0 days.

(21) Appl. No.: 13/825,901

(22) PCT Filed: Sep. 22, 2011

(86) PCT No.: PCT/EP2011/004754

§ 371 (c)(1), (2), (4) Date: May 9, 2013

(87) PCT Pub. No.: WO2012/038086

PCT Pub. Date: Mar. 29, 2012

(65) Prior Publication Data

US 2013/0217509 A1 Aug. 22, 2013

(30) Foreign Application Priority Data

Sep. 24, 2010 (DE) ......................... 10 2010 046 446

(51) Int. Cl.

*F16C 1/02* (2006.01)
*H01Q 3/32* (2006.01)
*H01Q 1/24* (2006.01)
*H01Q 1/52* (2006.01)

(52) U.S. Cl.

CPC ............... *F16C 1/02* (2013.01); *F16C 2380/00* (2013.01); *H01Q 3/32* (2013.01); *H01Q 1/246* (2013.01); *H01Q 1/52* (2013.01); *Y10S 464/90* (2013.01)

USPC ............................................ 464/58; 464/900

(58) Field of Classification Search

CPC ... F16C 1/02; F16D 41/206; F16D 12/12132; Y10S 464/90

USPC .............................. 464/57–60, 900; 74/502.5

See application file for complete search history.

(56) References Cited

U.S. PATENT DOCUMENTS

| | | | | |
|---|---|---|---|---|
| 3,177,901 | A | 4/1965 | Pierce | |
| 3,559,693 | A | 2/1971 | Remi et al. | |
| 3,676,576 | A | 7/1972 | Dubernet et al. | |
| 3,681,911 | A * | 8/1972 | Humphries | |
| 4,362,069 | A | 12/1982 | Giatras et al. | |
| 4,475,820 | A | 10/1984 | Mulligan | |
| 5,052,404 | A * | 10/1991 | Hodgson | 464/58 X |
| 2004/0087379 | A1 | 5/2004 | Schwartz | |

FOREIGN PATENT DOCUMENTS

| | | | | |
|---|---|---|---|---|
| DE | 97223 | * | 6/1898 | 464/58 |
| GB | 943437 | | 12/1963 | |
| GB | 1121625 | | 7/1968 | |
| GB | 2 015 699 | | 9/1979 | |

OTHER PUBLICATIONS

International Search Report for PCT/EP2011/004754, mailed Jan. 4, 2012.

* cited by examiner

*Primary Examiner* — Gregory Binda

(74) *Attorney, Agent, or Firm* — Nixon & Vanderhye P.C.

(57) ABSTRACT

A flexible shaft for torque transfer has a plurality of metal wires that are helically wound in a plurality of layers with an opposite winding direction that alternates from layer to layer. Each of the metal wires is surrounded by an electrically insulating insulation layer. The insulating layer prevents a metal-on-metal contact between adjacent metal wires and thereby prevents unwanted intermodulation products.

7 Claims, 1 Drawing Sheet

INTERMODULATION-RESISTANT FLEXIBLE SHAFT HAVING ELECTRICALLY INSULATING COATED WIRES

CROSS-REFERENCE TO RELATED APPLICATIONS

This application is the U.S. national phase of International Application No. PCT/EP2011/004754, filed 22 Sep. 2011, which designated the U.S. and claims priority to DE Application No. 10 2010 046 446.5, filed 24 Sep. 2010, the entire contents of each of which are hereby incorporated by reference.

STATEMENT REGARDING FEDERALLY SPONSORED RESEARCH OR DEVELOPMENT

None.

FIELD

The invention relates to a flexible shaft for transmitting torques, comprising a plurality of wires which lie closely against one another and are wound in a helical pattern, which wires are wound in a plurality of layers which are arranged one above the other and in a winding direction that alternates from layer to layer.

BACKGROUND & SUMMARY

Flexible shafts have long been known as machine elements for transmitting torques when drive input and drive output are not aligned, i.e. are mutually offset, or when mobile machines or devices are to be driven with low power. In these cases, flexible shafts can transmit the rotational movement highly uniformly, are not susceptible to environmental conditions and are far cheaper than drive chains containing rigid shafts, bevel gears, flexible couplings etc. In addition, particular advantages of flexible shafts are that tight bend radii are possible, and that shafts can be laid using a plurality of bends and can be fitted where space is limited. Furthermore, flexible shafts can also compensate for changes in length of different individual parts as a result of thermal expansion. If flexible shafts are designed as hollow shafts, electrical or optical signals can also be transmitted inside the shaft.

Numerous configurations of flexible shafts are known. Normally they are composed of a plurality of layers of multiple windings of thin metal wires usually made of steel, in particular spring steel, which layers are wound one above the other in an alternately right-handed and left-handed helical pattern. High quality flexible shafts are obtained by heat treatments carried out after winding. It is likewise possible in flexible shafts that at least individual layers are twisted (stranded) or braided so that it is possible to transmit higher compressive and tensile forces or in order to form a wire rope.

The advantageous properties of flexible shafts mean that they are also used in electronic equipment or antennas for drive, adjustment or control purposes. A specific application is to use flexible shafts to move phase shifters in antennas, in particular in mobile communications antennas, in order to adjust specifically the radiator provided in the antenna as regards the down-tilt angle thereof in the elevation direction or the angle of radiation thereof in the azimuth direction. The phase shifter is here connected mechanically via the flexible shaft to an associated actuator (electric motor), which produces the required rotational movement of the flexible shaft and thereby the movement of the phase shifter.

When using flexible shafts in electronic equipment and antennas, it is disadvantageous that the metal wires or individual strands of the flexible shaft can touch at undefined points during the transmission of torque or power, or even in the idle state as a result of vibrations, jolts and temperature fluctuations, causing unwanted intermodulation products to occur in the electronic equipment or antennas. Such intermodulation or interference products reduce the transmission capability for antennas.

The object of the invention is therefore to create a flexible shaft which can be used to avoid unwanted intermodulation products.

The metal wires of the flexible shaft are each enclosed by an electrically insulating insulation layer, which prevents metal-to-metal contact between adjacent metal wires.

The invention prevents undefined metal contacts, i.e. electrically conducting contacts, between the individual wires of the flexible shaft, and hence unwanted intermodulations in electronic equipment or antennas. Reductions in the transmission capability for antennas can be avoided. In addition, the insulation layer provides excellent corrosion protection for the metal wires, thereby enabling use in corrosive atmospheres. It is also possible to lay the flexible shaft in a metal pipe or using metallic supports without the possibility of galvanic corrosion occurring or electrical contact being made with the metal pipe or the supports. Furthermore, the insulation layer improves the anti-friction properties of the individual wires between one another and of the flexible shaft in a sheath, if such a sheath is provided.

The terms “metal wire” or “wire” used in the present invention include all types of thin wires or strands that are suitable for producing flexible shafts.

Preferably, all the metal wires in the flexible shaft are each enclosed by such an insulation layer. It is also possible, however, to use a suitable mix of insulated and uninsulated wires, i.e. to provide only some of the wires with a suitable insulation layer, if this can reduce the undefined electrical contacts between the wires to the desired degree. In addition, it is also possible when there are a plurality of layers lying one above the other to provide an entire internal layer with an additional insulating jacket that electrically insulates an internal layer from an adjacent outer layer.

The insulation layer is advantageously a uniformly thin, firmly adhering, abrasion-resistant, non-porous and expandable electrically insulating layer.

According to an advantageous embodiment of the invention, the insulation layer has a thickness of less than or equal to 60 μm, in particular a thickness of less than 10 μm. Insulation layers of such thin dimensions mean that the diameter of the flexible shaft is increased only slightly compared with conventional configurations without insulation.

According to an advantageous embodiment, the insulation layer is made of a plastics sheathing or a paint coating. High temperature paints or PTFE (polytetrafluoroethylene) are particularly advantageous for this purpose because these materials allow heat treatment of the torque-transmission and/or power-transmission apparatus after winding.

It is particularly advantageous if the insulation layer has a temperature stability of at least 240° C., because particularly effective heat treatments of the ready-wound flexible shaft are possible at temperatures above 240° C.

BRIEF DESCRIPTION OF THE DRAWINGS

The invention is explained in greater detail below with reference to the drawings, in which.

DETAILED DESCRIPTION

Figure 1:
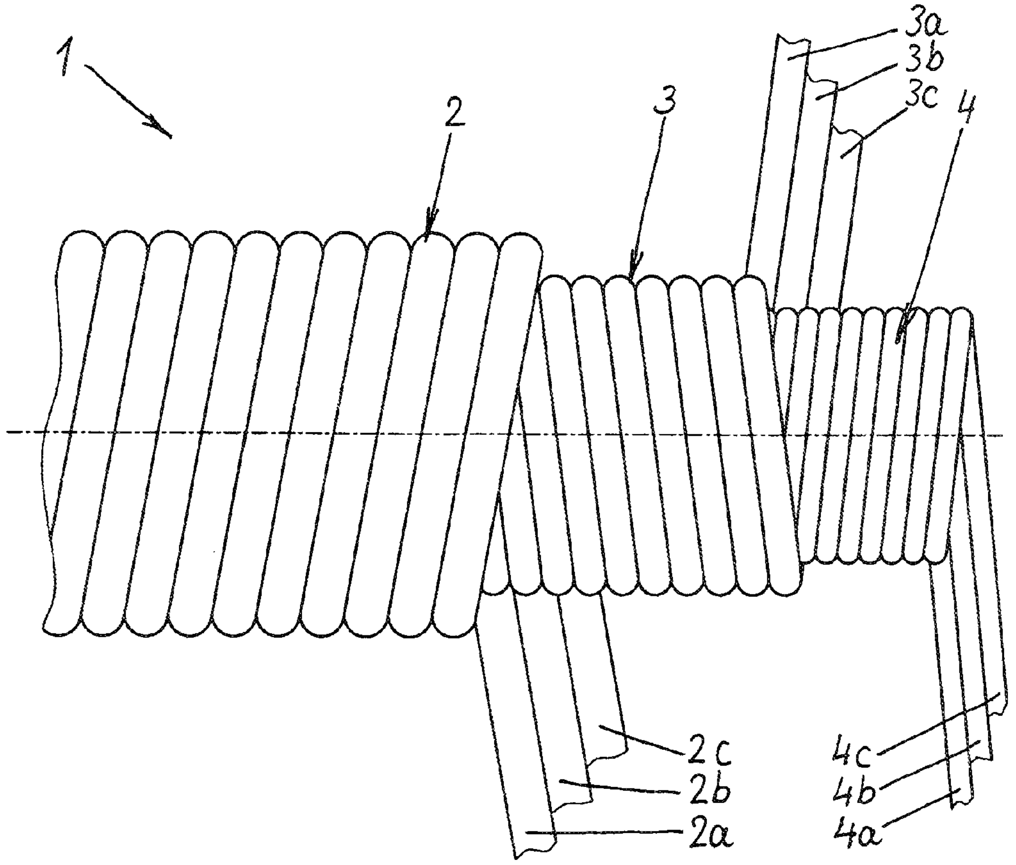
FIG. 1: shows a partially unwound portion of a flexible shaft comprising three layers.

FIG. 1 shows a partially unwound portion of a flexible torque-transmission element in the form of a flexible shaft 1.

The flexible shaft 1 has a three-layer construction and comprises an outer layer 2, which is formed by three wires 2*a*, 2*b*, 2*c*, a central layer 3, which is formed by three wires 3*a*, 3*b*, 3*c*, and an inner layer 4, which is formed by three wires 4*a*, 4*b* and 4*c*. As can be seen, the layers 2, 3, 4 are wound in a helical pattern, with the outer layer 2 and the inner layer 4 having the same winding direction whilst the central layer 3 is wound in the opposite direction.

The individual windings of each layer 2, 3, 4 lie tightly against one another. In addition, the individual layers 2, 3, 4 lie closely on one another.

The wires 2*a*, 2*b*, 2*c*; 3*a*, 3*b*, 3*c*; 4*a*, 4*b*, 4*c* each have a circular cross-section. It is also easily possible, however, to use wires having a different cross-section, in particular having a rectangular cross-section.

Figure 2:
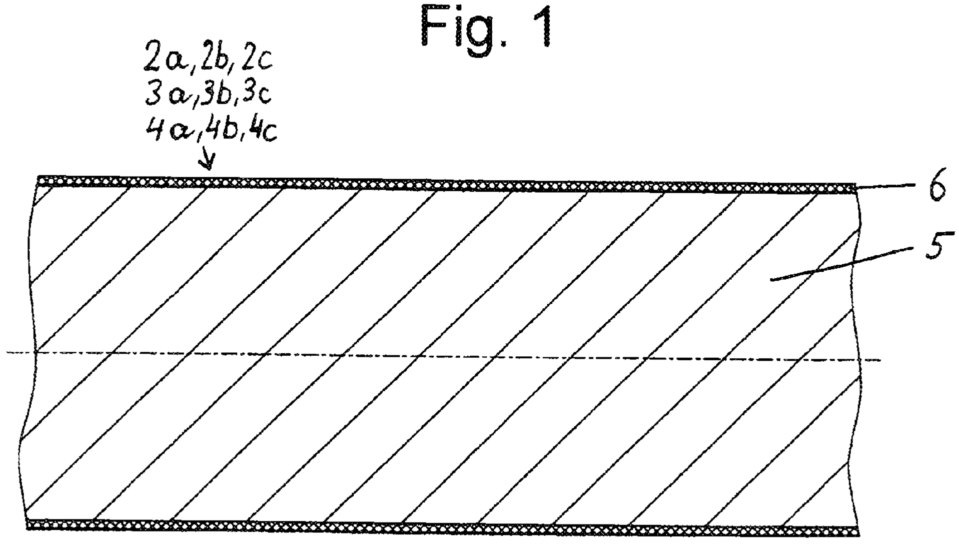
FIG. 2: shows a longitudinal section through a wire that is used in the flexible shaft of FIG. 1.

As can be seen from FIG. 2, each wire 2*a*, 2*b*, 2*c*; 3*a*, 3*b*, 3*c*; 4*a*, 4*b*, 4*c* is made of a metal wire 5 and an insulation layer 6, which encloses the metal wire over the entire extent thereof. This insulation layer 6 consists of a firmly adhering, abrasion-resistant, non-porous and expandable electrically insulating material, which is provided in such a form that the insulation layer 6 is not destroyed in the production of the flexible shaft 1. The insulation layer 6 advantageously consists of a temperature-resistant paint or of a PTFE coating.

Thus, metal wires 5 that have already been coated in advance individually with a suitable firmly adhering insulation layer 6 are used for winding the flexible shaft 1. Even when the wires 2*a*, 2*b*, 2*c*; 3*a*, 3*b*, 3*c*; 4*a*, 4*b*, 4*c* lie closely against one another, as shown in FIG. 1, the individual metal wires 5 are electrically insulated from one another both in the idle state and under mechanical load. Thus, when used in electronic equipment or antennas, no intermodulation is produced even when the individual windings and wires move relative to one another and rub against one another.

The invention claimed is:

1. Flexible shaft for transmitting torques, comprising:

a plurality of wires which lie closely against one another and are wound in a helical pattern, which wires are wound in a plurality of layers which are arranged one above the other and in a winding direction that alternates from layer to layer, and each wound layer consists of a metal wire and an electrically insulating insulation layer, which encloses the metal wire over the entire extent thereof and prevents metal-to-metal contact between adjacent metal wires including between adjacent windings of each metal wire.

2. Flexible shaft according to claim 1, wherein the insulation layer has a thickness of less than or equal to 60 μm.

3. Flexible shaft according to claim 1, wherein the insulation layer is made of a plastics sheathing or a paint coating.

4. Flexible shaft according to claim 1, wherein the insulation layer consists of PTFE.

5. Flexible shaft according to claim 1, wherein the insulation layer has a temperature stability of at least 240° C.

6. Flexible shaft according to claim 1, wherein the insulation layer has a thickness of less than 10 μm.

7. Flexible shaft for transmitting torques, comprising:

a plurality of wires which lie closely against one another and are wound in a helical pattern, which wires are wound in a plurality of layers which are arranged one above the other and in a winding direction that alternates from layer to layer, and each of the wound plurality of layers comprises a metal wire and an electrically insulating insulation layer, which encloses the metal wire over the entire extent thereof and prevents metal-to-metal contact between adjacent metal wires including between adjacent windings of each metal wire.

* * * * *